United States Patent [19]
Nakano

[11] 3,946,504
[45] Mar. 30, 1976

[54] UTTERANCE TRAINING MACHINE

[75] Inventor: Toyomichi Nakano, Hiroshima, Japan

[73] Assignee: Canon Kabushiki Kaisha, Tokyo, Japan

[22] Filed: Feb. 26, 1975

[21] Appl. No.: 553,286

[30] Foreign Application Priority Data
Mar. 1, 1974 Japan .................. 49-23945

[52] U.S. Cl. .................. 35/35 C; 179/1 SP
[51] Int. Cl.² .................. G09B 19/04
[58] Field of Search .......... 35/1, 8 A, 35 R, 35 C, 73/204; 128/2.08; 179/1 SP

[56] References Cited
UNITED STATES PATENTS

| | | | |
|---|---|---|---|
| 2,212,431 | 8/1940 | Bly .................. | 35/1 |
| 2,416,353 | 2/1947 | Shipman et al. .................. | 35/1 |
| 2,892,040 | 6/1959 | Johnson et al. .................. | 35/35 C X |
| 3,045,666 | 7/1962 | Dubsky et al. .................. | 128/2.08 |
| 3,142,909 | 8/1964 | Irazoqui .................. | 35/35 C |
| 3,606,883 | 9/1971 | Poirier et al. .................. | 128/2.08 |
| 3,645,133 | 2/1972 | Simeth et al. .................. | 73/204 |
| 3,703,774 | 11/1972 | Goshima .................. | 35/35 C |
| 3,723,652 | 3/1973 | Alles et al. .................. | 197/1 SP |
| 3,749,852 | 7/1973 | Moriya et al. .................. | 35/35 C X |
| 3,881,059 | 4/1975 | Stewart .................. | 179/1 SP |

*Primary Examiner*—Wm. H. Grieb
*Attorney, Agent, or Firm*—Fitzpatrick, Cella, Harper & Scinto

[57] ABSTRACT

An utterance training machine comprises flow speed detector for converting the flow speed of expiration into an electrical signal to provide a flow speed signal, acoustic-electric converter for converting a voice into an electrical signal to provide a speech signal, an endless recording medium for recording and retaining thereon the speech signal and the flow speed signal, record-reproduce unit for causing the speech and flow speed signals to be recorded on the endless recording medium and for reproducing the recorded signals from the recording medium, set unit for setting the record-reproduce unit to record mode or reproduce mode, and display unit for recieving the flow speed and speech signals from the endless recording medium to display the waveforms of these signals on a screen when the record-reproduce unit is set to the reproduce mode by the set unit.

12 Claims, 3 Drawing Figures

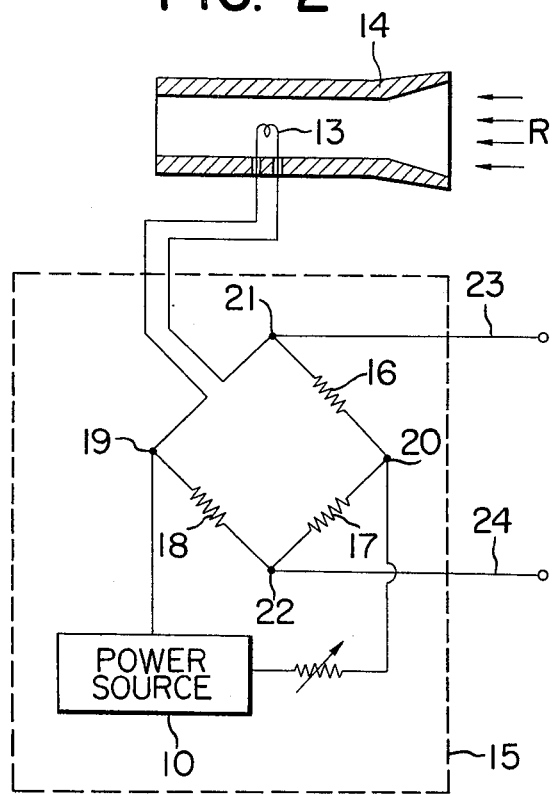
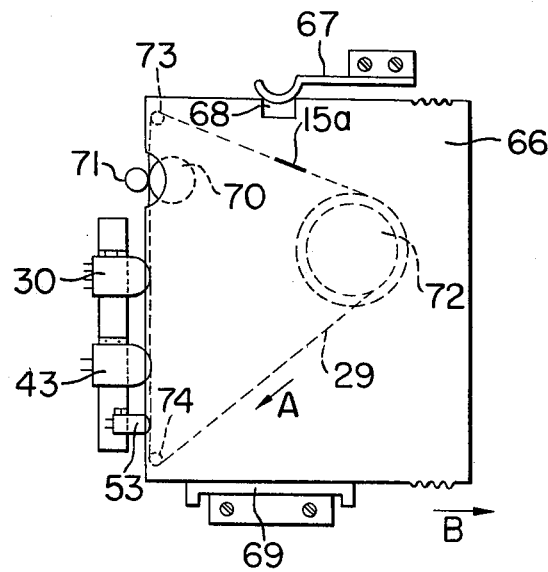

UTTERANCE TRAINING MACHINE

BACKGROUND OF THE INVENTION

1. Field of the Invention

This invention relates to an utterance training machine which enables a learner of utterance to visually confirm his own manner of utterance, and particularly to such a machine which enables the learner to visually confirm at the time the flow speed signals of expiration and speech signals produced during utterance.

2. Description of the Prior Art

Voice is a waveform produced by various organs acting on the expiration forced out of lung. Generally, the strength of voice and the amount of expiration are not in accord with each other and for example, in utterance of vowels, stronger voices may be produced by a lesser amount of expiration while utterance of whispers or consonants requires a greater amount of expiration. Therefore, how to use expiration forms an important factor in utterance of voices. Aurally normal people very naturally acquire to use their expiration to utter, but aurally handicapped persons (hereinafter referred to as the deaf) cannot obtain information by ear and find it difficult to acquire to use their expiration which is the requisite for utterance. On the other hand, even the aurally normal people would find it difficult to acquire to use their expiration as in foreign language learning, namely, when they learn to speak a language which they are not accustomed to speak every day or when they want to master such language within a very short period of time.

SUMMARY OF THE INVENTION

It is an object of the present invention to overcome the above-noted difficulties and to present an utterance training device which enables a trainee to visually confirm his own manner of utterance.

It is another object of the present invention to present an utterance training machine which can display at a time a plurality of datas required for utterance training.

It is still another object of the present invention to present an utterance training machine which enables one to repeatedly observe a plurality of data required for utterance training.

It is yet another object of the present invention to present an utterance training machine which permits a plurality of training modes to be selected.

Other objects and effects of the present invention will become more fully apparent from the following detailed description taken in conjunction with the accompanying drawings.

BRIEF DESCRIPTION OF THE DRAWINGS

FIG. 2 is a detailed circuit diagram particularly showing the flow speed detector element and the driving circuit in FIG. 1.

FIG. 3 particularly shows the magnetic tape in FIG. 1.

DESCRIPTION OF THE PREFERRED EMBODIMENTS

Figure 1:
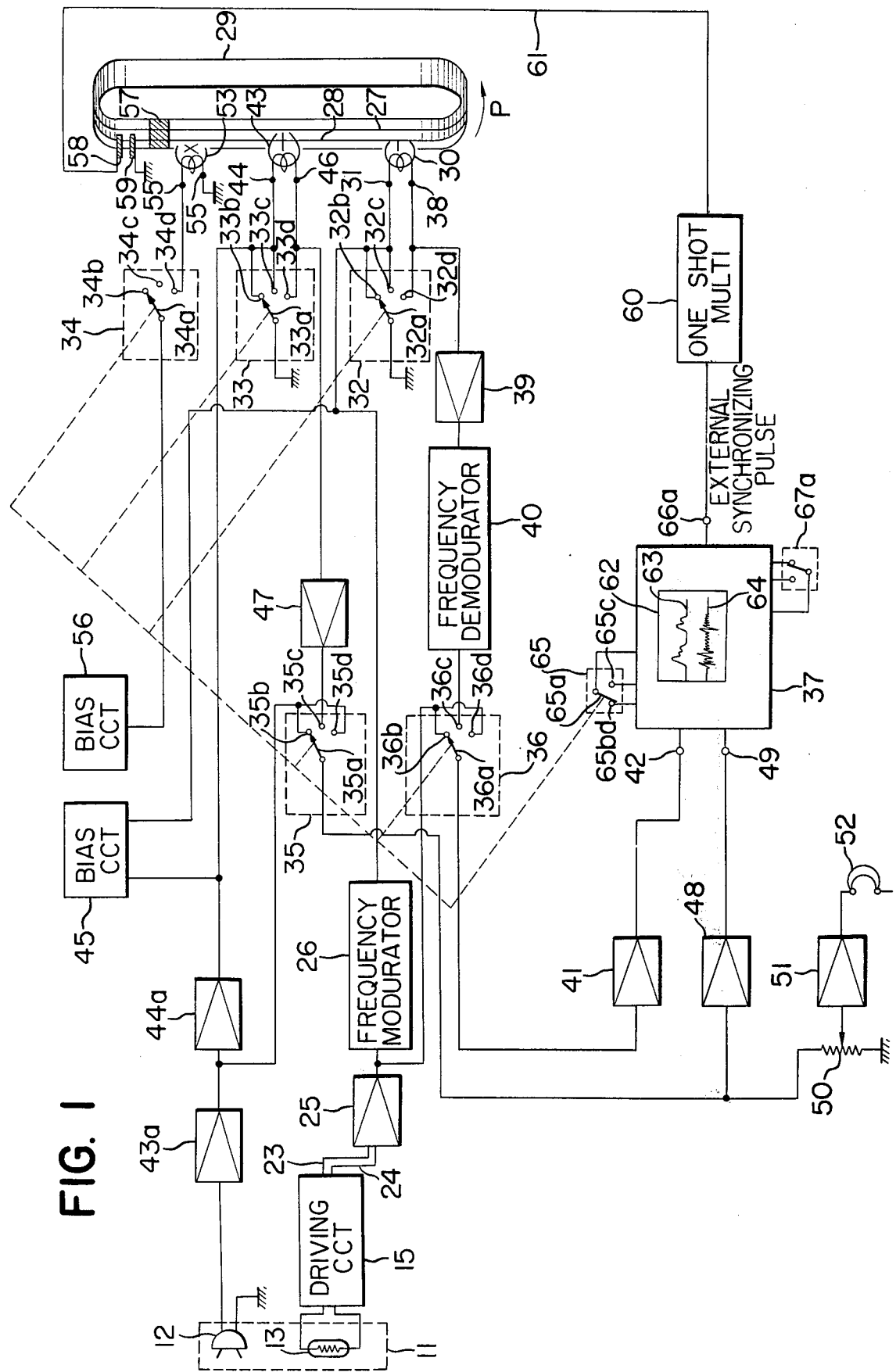
FIG. 1 is a block diagram of the utterance training machine according to the present invention.

An embodiment of the present invention will hereinafter be described with reference to the drawings. The words "main body" appearing herein refer to the other portion that a removable cartridge containing therein an endless tape which will hereinafter be described.

FIG. 1 is a block diagram showing the electrical construction of the main body. Designated by 11 is a signal detecting portion which includes a microphone 12 for detecting speech signals which are vibrations of expiration, and a flow speed detector element (hot wire) 13 for detecting the flow speed of expiration. The flow speed detector element (hot wire) 13 comprises a wire formed of platinum heating in response to a current flowing thereto (hereinafter referred to as "hot wire"), and is accommodated within a circular cylinder 14 open at the opposite ends, as shown in FIG. 2. Such hot wire 13 generates heat upon application of a predetermined current from a power source 10 included in a driving circuit 15 if atmospheric temperature and other ambient conditions are constant, and has a predetermined resistance value determined by the temperature of the generated heat. However, if air flows into the cylinder in the direction of arrows R indicated in FIG. 2, the generated heat will be lost by the moving air to reduce the temperature of hot wire and accordingly, vary the resistance value of the hot wire. The variation in resistance value is correlated to the speed of movement of the air and therefore, by detecting such variation, the speed of movement of the air may be detected, that is, by giving expiration in the direction of arrows R, the flow speed of the expiration may be detected.

The actual circuit, as shown in FIG. 2, comprises a bridge formed by three resistors 16, 17, 18 and said hot wire 13, and a power source 10 is interconnected with both the junction 19 between the hot wire 13 and the resistor 18 and the junction 20 between the resistors 16 and 17 so as to supply a heating current to the hot wire 13, and signal lines 23 and 24 are respectively connected to the junction 21 between the hot wire 13 and the resistor 16 and the junction 22 between the resistors 17 and 18 so that the voltage variation having a voltage resulting from the variation in the resistance value of the hot wire 13 may be derived as flow speed signal from the signal lines 23 and 24.

The flow speed signal thus derived from the signal lines 23 and 24 may be amplified by an amplifier 25, whereafter the amplified signal may be applied to a frequency modulator 26 for frequency modulation, the output of the frequency modulator 26 being connected to a coil terminal 31 of magnetic record-reproduce head 30 opposed to a track 28 on an endless magnetic tape 29 which has two tracks 27 and 28.

Switches 32, 33, 34, 35 and 36 are provided and have movable contacts 32a, 33a, 34a, 35a, 36a and fixed contacts 32b, 32c, 32d, 33b, 33c, 33d, 34b, 34c, 34d, 35b, 35c, 35d, 36b, 36c, 36d. The movable contacts 32a, 33a, 34a, 35a and 36a of the respective switches are operatively associated together by unshown mechanism so as to be movable simultaneously. These movable contacts are also designed to engage corresponding fixed contacts of the respective switches (in FIG. 1, those fixed contacts given identical suffix letters). When the movable contacts are connected to the fixed contacts given the suffix b, as will further be described, the speech signal and the flow speed signal provided by the detecting portion 11 may directly be applied to a displayer 37 to permit these signals to be immediately observed (direct display mode). When the movable contacts are connected to the fixed contacts given the suffix d, the speech signal and the flow speed signal provided by the detecting portion 11 may be recorded on the tracks 27 and 28 of the magnetic tape 29 while, at the same time, they may directly be applied to the displayer 37 (record mode). when the movable contacts are connected to the fixed contacts given the suffix c, the speed signal and the flow speed signal recorded on the tracks 27 and 28 of the magnetic tape 29 may be detected and applied to the displayer 37 (reproduce mode).

The coil terminal 31 of the magnetic head 30 is further connected to a record bias circuit 45 and also to the contacts 32b and 32c, and the coil terminal 38 is connected to the contacts 32d and also to an amplifier 39, by which the signal may be amplified and applied therefrom to a frequency demodulator 40, in which the frequency-modulated flow speed signal may be demodulated and the demodulated output may be applied to the contact 36c of the switch 36. The movable contact 36a of such switch 36 is connected to the signal input terminal of an amplifier 41, the output terminal of which is connected to one input terminal 42 of the displayer 37. The contacts 36b and 36d of the switch 36 are connected in common to an output terminal for deriving therefrom the output of the amplifier 25.

On the other hand, the output of the microphone 12 which is an acoustic-electric converter may be applied to the input terminal of a preamplifier 43a, the output of which may be applied to the input terminal of an amplifier 44a, the output of which is in turn connected to a coil terminal 44 of a magnetic record-reproduce head 43 provided in opposed relationship with the track 27 of the magnetic tape 29. Such coil terminal 44 is further connected to a record bias generating circuit 45 and also to the contacts 33b and 33c.

The other coil terminal 46 of the magnetic head 43 is connected to the contact 33d and also to the input terminal of an amplifier 47, the output of which is connected to the contact 35c of the switch 35. The movable contact 35a of the switch 35 is connected to the input terminal of an amplifier 48, the output of which may be applied to a second input terminal of the displayer 37. The movable contact 35a is also connected through a variable resistor 50 to an amplifier 51, the output of which may be applied to a headphone 52 which is an electric-acoustic converter.

The contacts 35b and 35d of the switch 35 are connected in common to the input terminal of the amplifier 44a.

Designated by 53 is an erase head which is arranged to impart an erase flux effectively to the tracks 27 and 28 so as to erase the recorded signals on these tracks. One end of one coil terminal 54 thereof is connected to a reference potential source and the other coil terminal 55 is connected to the contact 34d of the switch 34, the movable contact 34a of which is connected to the output terminal of an erase bias generating circuit 56 for applying an erasing current to the erase head.

A piece of sensing foil 57 formed of aluminum foil or like material is secured to the magnetic tape 29 at a point thereon, and two metal pieces 58 and 59 are fixedly disposed at a space interval shorter than the length of the sensing soil and for engagement with that surface of the magnetic tape 29 to which the sensing foil is secured. The metal piece 59 is connected to the reference potential source and the other metal piece 58 is connected to the trigger terminal of a one-shot multivibrator 60, the output of which may be applied as an external synchronizing signal to the external synchronizing signal input terminal 66a of the displayer 37.

When the magnetic tape 29 is moved between the metal pieces 58 and 59 until the sensing foil 57 reaches a point between these metal pieces 58 and 59, the voltage level of the signal line 61 is varied and this varied voltage component drives the one-shot multivibrator 60 so that such multivibrator provides a pulse signal (external synchronizing pulse) having a predetermined width determined by the time constant of the one-shot multivibrator.

Thus, such external synchronizing pulse may be derived when the sensing foil on the magnetic tape 29 reaches a point between the metal pieces 58 and 59, or when the endless magnetic tape 29 comes to a predetermined position. It should be understood that the endless magnetic tape 29 is driven by unshown mechanism in the direction of arrow P at a predetermined speed when the utterance training machine shown in FIG. 1 has been rendered operative.

The displayer 37 is one which comprises a cathode-ray tube. Electron beams may scan the screen 62 of the cathode-ray tube at a predetermined speed from left to right in FIG. 1 and such beams may be vertically deflected by the signals applied to the input terminals 42 and 49, thereby displaying such waveforms as indicated at 63 and 64. The displayer 37 further includes therein a change-over switch 67a for changing the scanning speed of the electron beams between high and low levels and a change-over switch 65 for effecting change-over between internal and external synchronizations.

When the movable contact 65a of the switch 65 is connected to the fixed contact 65b to provide internal synchronization, control is effected such that the electron beams scanning the screen 62 are pulled back to the left end by a horizontal synchronizing signal generated internally of the displayer 37 or the beams are brought back to the scanning start position at the left end of the screen upon application of the synchronizing signal. When the movable contact 65a is connected to the fixed contact 65c to provide external synchronization, control is effected such that the electron beams scanning the screen 62 from left to right in the drawing is brought back to the scanning start position at the left end of the screen 62 by a horizontal synchronizing signal which is a pulse signal applied to the external synchronizing signal input terminal 66a. Signals applied from the two input terminals 42 and 49 are displayed at two locations on the screen 62.

The above-described displayer 37 having two input terminals 42 and 49, external synchronizing signal input terminal 66a, switches 65 and 65a and screen 62 may directly be provided by a commercially available two-channel oscilloscope such as, for example, two-channel oscilloscope Type 454 supplied by TEKTRONIX, Inc.

Thus, in FIG. 1, by leaving the switch 65 and the switches 32–36 operatively associated so that when the movable contacts a of the switches 32–36 engage the contacts b or d, the movable contact 65a of the switch 65 engages the contact 65bd and that when the movable contacts a of the switches 32–36 engage the contacts c, the movable contact 65a of the switch 65 engages the contact 65c, the speech signal and the flow speed signal provided by the microphone 12 and the flow speed detector element 13 may be displayed on the screen 62 by the internal synchronizing signal, during direct display mode and during record mode, and the speech signal repeatedly reproduced from the endless magnetic tape 29 and the flow speed signal may be repeatedly displayed, during reproduce mode, on the screen 62 at the same locations thereof by the electron beams controlled by the external synchronizing pulse applied from the external synchronizing signal input terminal 66a.

During the reproduce mode, as noted above, the external synchronizing pulse controls the electron beams scanning the screen 62. This is because, when the endless magnetic tape 29 is repeatedly played back and the reproduced signals are to be displayed, the repeatedly displayed identical waveforms may not appear at the same locations on the screen 62 if the internal synchronization alone is used. To eliminate such inconvenience, the present invention is designed to detect the position of the magnetic tape 29 and controls the locations of the electron beams in accordance with the so detected position.

Also, in the present embodiment, the waveform of the signal applied from the input terminal 42 is displayed on the screen 62 in the upper portion thereof as indicated at 63, while the waveform of the signal applied from the input terminal 49 is displayed on the screen 62 in the lower portion thereof as indicated at 64.

FIG. 3 shows a cartridge for containing therein the endless magnetic tape 29 shown in FIG. 1, magnetic head for recording, reproducing and erasing, and cartridge holder means. Numeral 66 designates the cartridge for containing therein the endless magnetic tape 29, numeral 67 a cartridge securing click plate spring fixed to unshown main body's base plate, numeral 68 a clicking recess formed in the cartridge 66 for receiving therein the plate spring 67, numeral 69 a cartridge guide plate for guiding the cartridge 66 when inserted into the main body, numeral 70 a pinch roller rotatably disposed within the cartridge 66 for holding the magnetic tape 29 between itself and a capstan 71 provided on the main body, numeral 72 a reel within the cartridge 66 and for passing the endless magnetic tape 29 thereover, and numerals 73 and 74 tape guides within the cartridge 66 and for guiding the tape 29. The capstan 71, secured to the main body, is rotatable at a predetermined velocity during operation of the main body by a driving system, and may be urged against the pinch roller 70 within the cartridge 66 when the click plate spring 67 is received in the clicking recess 68 of the cartridge 66, namely, when the cartridge 66 has been inserted in the main body, whereby moving the tape 29 at a predetermined velocity in the direction of arrow A.

The cartridge 66 is removable from the main body by pulling it in the direction of arrow B, so that the cartridge may be replaced by another cartridge containing therein a length of endless magnetic tape corresponding to the length of the content of training desired by the learner. By operating the change-over switch 67a which changes the sweep time of the displayer having a cathode-ray tube oscilloscope in accordance with the length of the endless tape 29 then in the cartridge 66, the sweep time may be adjusted to a time required for the magnetic tape to make one round or to a little longer time, thereby enabling the learner to do his exercises effectively.

Operation of the utterance training machine constructed as described above will now be explained.

The mode of operation, as noted above, is generally described into three modes, i.e. (1) direct display mode, (2) record mode and (3) reproduce mode.

First, cartridge 66 containing therein an endless tape of a length corresponding to the length of the material to be learned is inserted into the main body, and then, by the use of the sweep time change-over switch 67a, the sweep time of the displayer 37 having a cathode-ray tube oscilloscope is set to a time required for the endless magnetic tape 29 to make substantially one round or to a little longer time. By doing so, the electron beam bright spot on the screen 62 will be returned to the left end by the external synchronizing pulse formed in the one-shot multivibrator 60 when the metal pieces 58 and 59 have been rendered conductive by the sensing foil 57 on the magnetic tape 29 with movement of the tape during reproduce mode, and the electron beams will be swept to the right on the cathode-ray tube in the sweep time set by the change-over switch 67a, and thereafter, the electron beam bright spot will again be returned to the left end in synchronism with the pulse continuedly generated from the one-shot multivibrator with the movement of the magnetic tape 29. The switches 32–36 and 65 are operated in an associated manner to make electrial connections between movable contacts and fixed contacts, i.e. between 32a–32b, 33a–33b, 34a–34b, 35a–35b, 36a–36b and 65a–65bd, whereupon the main body assumes the "direct display mode". Thus, when the learner utters to the detecting portion 11, the speech signal and the expiration flow speed signal are detected as electrical signals by the microphone 12 and by the hot wire 13 and its driving circuit 15, respectively. The speed signal so detected is amplified by the preamplifier 43a and supplied to the amplifier 48 through the contacts 35b–35a of the switch 35. The speech signal is adjusted in its volume by the volume adjusting variable resistor 50, whereafter it is supplied to the amplifier 51 for further amplification and supplied to the headphone 52, by which the speech signal is converted into an audible signal. The speech signal supplied to the amplifier 48 is also amplified by this amplifier and supplied to the vertical signal input terminal 49 of the displayer 37. On the other hand, the flow speed signal converted into an electrical signal is amplified by the amplifier 25 and applied through the contacts 36b–36a to the amplifier 41 for further amplification, and thence supplied to the vertical signal input terminal 42 of the displayer 37. Since the change-over switch 65 has been rendered to internal synchronizing condition, the speech signal and the expiration flow speed signal are simultaneously displayed as visible signals on the screen 62 by the internal synchronizing signal, whereby the learner may observe the speech signal and the flow speed signal comparatively while listening to the speech signal by means of the headphone 52.

Subsequently, the switches 32–36 and 65 are operated in an associated manner to make electrical connections between the movable contacts and the fixed contacts, i.e. between 32a–32d, 33a–33d, 34a–34d, 35a–35d, 36a–36d and 65a–65d, whereupon the main body assumes record mode. When the learner utters to the detecting portion 11, the speech signal and the flow speed signal are displayed as visible signals on the screen 62 of the displayer 37 by the internal synchronizing signal in the same manner as described with respect to the direct display mode, since electrical connections have been established between the contacts 35d–35a and 36d–36a of the switches 35 and 36. Also, the speech signal can be heard as audible signal by means of the headphone 52 and at the same time, it is amplified by the preamplifier 43a and the amplifier 44 and superposed upon a record bias signal from the bias generator circuit 45, whereafter the signal is supplied as record signal to the magnetic record-reproduce head 43 and recorded on the track 27 of the endless magnetic tape 29 through the contacts 33a–33d of the switch 33 forming a return electrode for the record signal. On the other hand, the flow speed signal amplified by the amplifier 25 is frequency-modulated by the frequency modulator 26 and superposed upon the bias signal from the record bias generator circuit 45, whereafter it is supplied as record signal to the magnetic record-reproduce head 30 and recorded on the other track 28 of the endless magnetic tape 29 than the speech signal recording track 27 through the contacts 32d–32a of the switch 32 forming a return electrode for the record signal. By the erase head 53 lacated upstream of the magnetic record-reproduce heads 43 and 30 with respect to the direction of movement of the tape, the signals on the tracks 27 and 28 are erased by a signal in accordance with an erase signal supplied from the erase bias generator circuit 56 through the contacts 34a–34a of the switch 34. In order that the flow speech signal may be displayed in the form of visible signal, it will be effective to effect frequency modulation during recording. This is because the flow speed signal requires its frequency component to be from a direct current up to 100 Hz.

Subsequently, the switches 32–36 aand 65 are operated in an associated manner to make electrical connections between the movable contacts and the fixed contacts, i.e. 32a–32c, 33a–33c, 34a–34c, 35a–35c, 36a–36c and 65a–65c, whereupon the main body assumes reproduce mode. Thus, the speech signal recorded on the track 27 of the endless magnetic tape 29 is detected and reproduced by the magnetic record-reproduce head 43 and amplified by the amplifier 47 due to electrical connections having been established between the contacts 33c–33a and 35c–35a of the switches 33 and 35.

The reproduced speech signal so amplified is delivered through the contacts 35c–35a to the volume adjusting variable resistor 50 for volume adjustment, and thence supplied to the amplifier 51. After further amplified by the amplifier 51, the speech signal is supplied to the headphone 52, by which it is converted into an audible signal. On the other hand, the speech signal supplied to the amplifier 48 is further amplified by this amplifier and supplied to the vertical signal input terminal 49 of the displayer 37 having the cathode-ray tube oscilloscope. In the meantime the modulated flow speed signal recorded on the track 28 of the endless magnetic tape 29 is detected and reproduced by the magnetic record-reproduce head 30 due to electrical connections having been established between the contacts 32c–32a and 36c–36a of the switches 32 and 36, and then amplified by the reproduce amplifier 39, whereafter the signal is demodulated into a reproduce flow speed signal by the frequency modulator circuit 40. The reproduce flow speed signal so demodulated is amplified by the amplifier 41 through the contacts 36c–36a of the switch 36, and supplied to the vertical signal input terminal 49 of the displayer 36 having the cathode-ray tube oscilloscope. At this time, the switch 65 is already in external synchronizing condition so that, under the control of the external synchronizing signal applied to the input terminal 66, the speech signal and the flow speed signal recorded on the endless magnetic tape 29 are repeatedly displayed as visible signals at the same locations on the screen 62, thus enabling the learner to observe the speech and flow speed signals comparatively while repetitively listening to the speech signal by means of the headphone 52.

By presetting the sweep time of the electron beams in the cathode-ray tube to a little longer time than the time required for the magnetic tape 29 to make one round, the bright spot is returned to the left end when the metal pieces 58 and 59 have been rendered conductive by the sensing foil 57 on the magnetic tape 29, so that the waveforms appearing on the screen 62 will not deviate with respect to the repeated play-back of the tape. Also, by using a cathode-ray tube of long afterglow characteristic as the screen, the speech and flow speed waveforms may be observed in stationary position on the cathode-ray tube 25.

Thus, according to the present invention, flow speed of expiration and speech may be displayed in the form of visible signals and further, the use of a recording medium such as endless magnetic tape or the like enables the waveforms of those signals to be observed in stationary position on the cathode-ray tube through easy means. Furthermore, replacement of the cartridge may readily meet the purpose of training for utterance of vocal sounds of variable lengths. Accordingly, the utterance training device of the present invention will be highly effective particularly for the purposes of foreign language learning or utterance training for the deaf.

In the illustrated embodiment, frequency modulation is effected for the recording of flow speed, whereas it will be apparent that amplitude modulation, phase modulation or other modulation may be employed for the same purpose.

I claim:
1. An utterance training machine comprising:
   flow speed detector means for converting the flow speed of expiration into an electrical signal to provide a flow speed signal;
   acoustic-electric converter means for converting a voice into an electrical signal to provide a speech signal;
   an endless recording medium for recording and retaining thereon said speech signal and said flow speed signal;
   record-reproduce means for causing said speech and flow speed signals to be recorded on said endless recording medium and for reproducing said recorded signals from said endless recording medium;
   set means for setting said record-reproduce means to record mode or reproduce mode; and
   display means for receiving said flow speed and speech signals provided from said endless recording medium to display the waveforms of said signals on a screen when said record-reproduce means is set to the reproduce mode by said set means.
2. An utterance training machine according to claim 1, further comprising:
   frequency modulator means for frequency-modulating said flow speed signal to record said signal on said endless recording medium; and
   frequency demodulator means for frequency-demodulating said frequency-modulated flow speed signal reproduced from said endless recording medium.

3. An utterance training machine according to claim 1, further comprising:
   detector means for detecting a predetermined position of said endless recording medium; and
   means for applying the detection signal provided by said detector means to said display means as external synchronizing signal.

4. An utterance training machine according to claim 3, wherein said detector means comprises:
   an electrically conductive member securely provided on said endless recording medium; and
   a pair of electrodes slidably engageable with said endless recording medium and electrically interconnected therebetween upon contact with said electrically conductive member.

5. An utterance training machine according to claim 1, further comprising:
   electric-acoustic converter means for receiving the speech signal provided from said endless recording medium to convert the same into an acoustic signal.

6. An utterance training machine according to claim 1, wherein said endless recording medium comprises an endless magnetic recording tape contained within a cartridge.

7. An utterance training machine comprising:
   flow speed detector means for converting the flow speed of expiration into an electrical signal to provide a flow speed signal;
   acoustic-electric converter means for converting a voice into an electrical signal to provide a speech signal;
   an endless recording medium for recording and retaining thereon said speech signal and said flow speed signal;
   record-reproduce means for causing said speech and flow speed signals to be recorded on said endless recording medium and for reproducing said recorded signals from said endless recording medium;
   set means for setting said record-reproduce means to record mode or reproduce mode;
   display means for receiving said flow speed and speech signals provided from said endless recording medium to display the waveforms of said signals on a screen when said record-reproduce means is set to the reproduce mode by said set means.
   means for applying said flow speed signal and said speech signal from said flow speed detector means and said acoustic-electric converter means to said display means when record mode is set by said set means; and
   means for stopping application of said flow speed and speech signals from said flow speed detector means and said acoustic-electric converter means to said display means when reproduce mode is set by said set means.

8. An utterance training machine according to claim 7, further comprising:
   detector means for detecting a predetermined position of said endless recording medium; and
   means for applying detection signal provided by said detector means to said display means as external synchronizing signal.

9. An utterance training machine according to claim 8, wherein said detector means comprises:
   an electrically conductive member securely provided on said endless recording medium; and
   a pair of electrodes slidably engageable with said endless recording medium and electrically interconnected therebetween upon contact with said electrically conductive member.

10. An utterance training machine according to claim 7, further comprising:
    frequency modulator means for frequency-modulating said flow speed signal to record said signal on said endless recording medium; and
    frequency demodulator means for frequency-demodulating said frequency-modulated flow speed signal reproduced from said endless recording medium.

11. An utterance training machine comprising:
    flow speed detector means for converting the flow speed of expiration into an electrical signal to provide a flow speed signal;
    acoustic-electric converter means for converting vibration of expiration into an electrical signal to provide a speech signal;
    an endless recording medium for recording and retaining thereon said speech signal and said flow speed signal;
    record-reproduce means for causing said speech and flow speed singals to be recorded on said endless recording medium and for reproducing said recorded from said endless recording medium;
    set means for setting said record-reproduce means to record mode or reproduce mode or non-record-reproduce mode wherein neither recording nor reproducing occurs;
    displaay means for receiving said flow speed and speech signals provided from said endless recording medium to display the waveforms of said signals on a screen when said record-reproduce means is set to the reproduce mode by said set means;
    means for applying said flow speed signal and said speech signal from said flow speed detector means and said acoustic-electric converter means to said display means when record mode is set by said set means;
    means for stopping application of said flow speed and speech signals from said flow speed detector means and said acoustic-electric converter means to said display means when reproduce mode is set by said set means; and
    means for applying said flow speed signal and said speech signal from said flow speed detector means and said acoustic-electric converter means to said display means when the non-record-reproduce mode is set by said set means.

12. An utterance training machine according to claim 8, wherein said endless recording mediums has thereon track for recording said flow speed signal and a track for recording said speech signal, individually.

* * * * *

UNITED STATES PATENT OFFICE
CERTIFICATE OF CORRECTION

Patent No. 3,946,504     Dated March 30, 1976

Inventor(s) TOYOMICHI NAKANO

It is certified that error appears in the above-identified patent and that said Letters Patent are hereby corrected as shown below:

Column 2, line 1, change "that" to -- than --.
Column 5, line 51, change "whereby" to -- thereby --.
Column 6, line 23, change "continuedly" to -- continuously --.
Column 7, line 26, change "34a-34a" to -- 34d-34a --; line 32, change "aand" to -- and --; line 62, change "modulator" to -- demodulator --; line 66, change "36" to -- 37 --.
Column 9, line 50, change "means." to -- means; --.
Column 10, line 33, change "singals" to -- signals --; line 35, before "from" insert -- signals --; line 39, change "displaay" to -- display --.

Signed and Sealed this

Fourteenth Day of September 1976

[SEAL]

Attest:

RUTH C. MASON
Attesting Officer

C. MARSHALL DANN
Commissioner of Patents and Trademarks